Jan. 4, 1927.  
W. W. TIMMIS  
LEVEL  
Filed March 4, 1926  
1,612,843
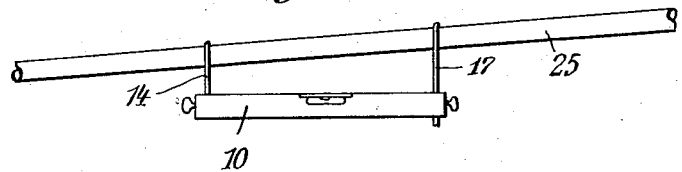
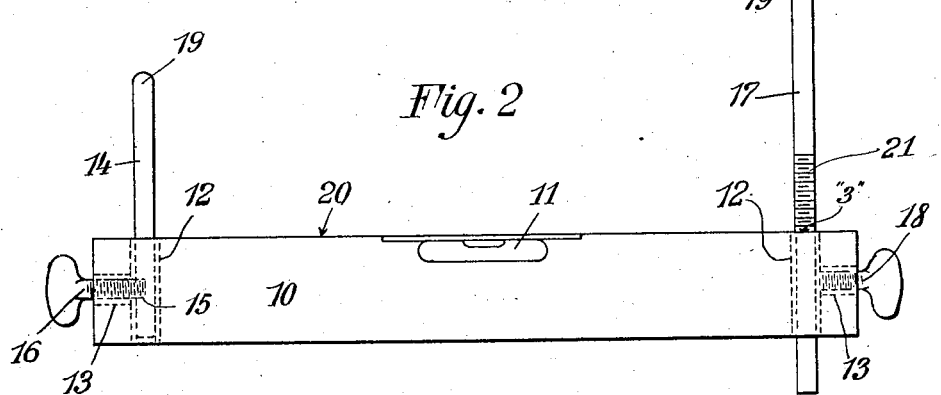
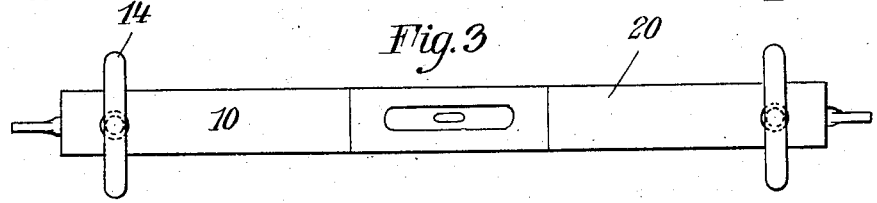
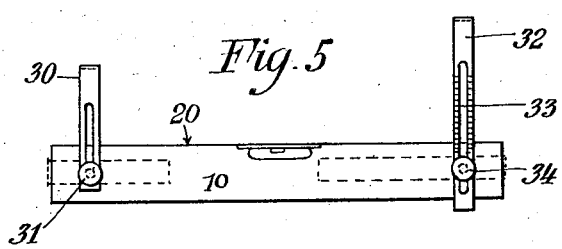
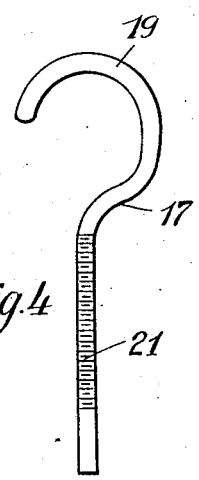
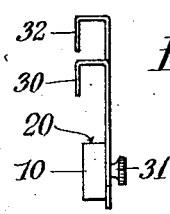
INVENTOR  
William W. Timmis  
BY  
Ivan E. A. Konigsberg  
ATTORNEY Patented Jan. 4, 1927.

1,612,843

UNITED STATES PATENT OFFICE.

WILLIAM W. TIMMIS, OF JAMAICA, NEW YORK, ASSIGNOR TO M. E. CONRAN & CO. INC., A CORPORATION OF NEW YORK.

LEVEL.

Application filed March 4, 1926. Serial No. 92,103.

This invention relates to levels and has particular reference to a level for the use of plumbers and steam fitters and similar trades or occupations.

More particularly this invention relates to a level especially well adapted for use in installing pipes requiring a certain pitch or inclination.

The object of the invention is to provide a level adapted to be suspended from a pipe or other element which requires a predetermined pitch or inclination from the horizontal.

The invention will be more fully understood from the following specification read in connection with the accompanying drawing in which—

Figure 1 is a view illustrating the use of my improved level.

Figure 2 is a side view of a level embodying the invention.

Figure 3 is a plan view thereof.

Figure 4 is a detail view of the graduated suspension member.

Figure 5 is a view in side elevation showing a modification.

Figure 6 is an end view thereof.

Referring to the drawing the numeral 10 denotes a level of usual construction having the usual liquid filled glass 11 wherein the position of the air bubble indicates the level position of the device.

In the present instance the level is provided with two suspension members, by means of which the level is supended from a pipe. One of said suspension members is then adjusted with respect to the level so as to position it in an inclined position on the pipe. The latter is then adjusted to a position in which the air bubble in the level is centered, and as a consequence, the pipe from which the level is supended will be found to be in a corresponding inclined position or to have the required pitch.

Referring now to the drawing, each end of the level 10 is provided with a vertical bushing or metal sleeve 12 which passes clear through the level. Each end is further provided with a horizontal threaded bushing or sleeve 13, 13 which extends from the end of the level into communication with the vertical sleeves 12, 12.

At one end of the level there is provided a shorter non-graduated suspension member 14 having a threaded socket 15. A screw 16 is threaded into the horizontal sleeve 13 and into the socket 15 whereby the suspension member is positioned in predetermined fixed position with respect to the level surface. At the other end there is provided a longer graduated suspension member 17 which is clamped in predetermined position within the sleeve 12 by means of a screw 18. Both suspension members are in the form of hook members, see Fig. 4, and the hook portions 19 are alike. The hooks 19 of the suspension members are adjustable with reference to the surface 20 of the level and the scale 21 on the member 17 is read with reference to said surface.

The scale 21 is calculated to read in figures indicating a given pitch of the pipe. For instance the numeral "3" shown in Fig. 2 by way of example may indicate a pitch of three inches in a given length measured in feet, and so on in an obvious and readily understood manner.

When the suspension members have been secured as aforesaid the level is hung on the pipe 25, Fig. 1, and the pipe is then adjusted until the instrument reads level when of course the pipe will have the pitch to which the level is set, thereby eliminating all measuring operations and guess work in pitching the pipe correctly.

In cases where the hook portions do not fit over the pipe, the instrument may be used with sufficient accuracy by using a separate wire hook or string to tie the instrument beneath the pipe in an obvious and convenient manner.

Referring now to Figs. 5 and 6, the shorter suspension member 30 is slotted and fixed in its position by a screw 31 which is screwed into the level, the bottom of the slot giving the proper operative position of the member 30. The longer graduated member 32 is also slotted as at 33 and is fixed in adjusted position by a screw 34.

When not in use the suspension members 30 and 32 may be turned endwise of the instrument as shown in dotted lines for convenience in shipping and carrying. Likewise of course, the suspension members shown in Fig. 2 may be removed from the vertical sleeves and laid alongside the level.

From the foregoing it will be clear that I have provided a level having means for suspending it from an element to be pitched or inclined in accordance with a given adjusted pitch of the instrument provided through the adjustment of a graduated suspension member having a suitable scale.

It is further obvious that the principle of the invention may be carried out by other means and that many of the details may be varied and changed. I do, therefore, not desire to limit myself to the exact disclosure otherwise than as is required by the scope of the appended claim.

I claim:—

As a new article of manufacture, a level comprising a body, a bubble tube therein, a vertically disposed bushing in each end of the body extending clear through the same, a horizontal threaded sleeve extending from each end of the body into the said bushings, two suspension members of unequal lengths adapted to be inserted in either of the two vertical bushings and set screws in engagement with said horizontal threaded sleeves for adjustably clamping the suspension members in predetermined positions relative to the said level.

WILLIAM W. TIMMIS.